UNITED STATES PATENT OFFICE.

NATHANIEL F. POTTER AND WILLIAM H. FENNER, JR., OF PROVIDENCE, RHODE ISLAND.

BLACKBOARD.

SPECIFICATION forming part of Letters Patent No. 290,651, dated December 18, 1883.

Application filed June 8, 1883. (No specimens.)

To all whom it may concern:

Be it known that we, NATHANIEL F. POTTER and WILLIAM H. FENNER, Jr., both of the city and county of Providence, and State of Rhode Island, have invented certain new and useful Improvements in Blackboards or Marking-Surfaces; and we do hereby declare that the following is a full, clear, and exact description of the same.

To enable those skilled in the art to which our invention belongs to make and use the same, we will proceed to describe the invention more in detail.

Our blackboard or marking-surface is made from soapstone, or talc, alum, lime-putty, black sand, silica, and mortar-black. The soapstone or talc is pulverized fine. The lime-putty is made from burnt lime, with water mixed therewith, to give it the consistency of mortar. The alum, black sand, silica, and mortar-black are all pulverized or powdered fine, and sifted or screened, and all of said ingredients or substances are mixed together to be used for our blackboard or marking-surface in about the following proportions: soapstone or talc, one hundred pounds; alum, seven pounds; lime-putty, one hundred pounds; black sand, one hundred pounds; silica, one hundred pounds, and mortar-black, eighty-eight pounds.

The above substances in substantially the proportions named are mixed together in a suitable receptacle, sufficient water being added to render the composition or coating sufficiently plastic to be easily spread upon any surface, and when it is thus ready for use one-fifth part of plaster-of-paris is added thereto.

Our blackboard composition or coating may be applied as follows: The brown mortar is applied to the laths of the wall or other surface in the usual way, and hand-floated to an even surface, ready to receive our blackboard compound or coating. The coating, having been previously prepared in the manner above described, is then spread upon the surface of the mortar or plaster, with a trowel or other suitable instrument, of a thickness of about one-eighth of an inch, and smoothed, so as to leave an even surface, which is then brushed with a dry brush, giving a smooth black surface especially adapted to be used as a blackboard or marking-surface without requiring any further attention.

Having thus described our improvements in blackboards or marking-surfaces, what we claim as new and of our invention, and desire to secure by Letters Patent, is—

A blackboard or marking-surface composed of soapstone or talc, alum, lime-putty, black sand, silica, mortar-black, and plaster-of-paris, in the proportions substantially as above described.

NATHANIEL F. POTTER.
WILLIAM H. FENNER, JR.

Witnesses:
GILMAN E. JOPP,
ASA LYMAN.